US012450661B2

(12) United States Patent
Menon et al.

(10) Patent No.: US 12,450,661 B2
(45) Date of Patent: Oct. 21, 2025

(54) SYSTEMS AND METHODS FOR PROPERTY DAMAGE PREVENTION AND MITIGATION

(71) Applicant: State Farm Mutual Automobile Insurance Company, Bloomington, IL (US)

(72) Inventors: Sunish Menon, Normal, IL (US); Weixin Wu, Normal, IL (US); Bernardo Bracero, Bloomington, IL (US); Jeffrey Wilson Stoiber, Bloomington, IL (US); Stan E. Gozur, Bloomington, IL (US); Jeremy Shawn Fogg, Bloomington, IL (US); Phillip Sangpil Moon, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 742 days.

(21) Appl. No.: 17/237,898

(22) Filed: Apr. 22, 2021

(65) Prior Publication Data

US 2024/0233030 A1 Jul. 11, 2024

Related U.S. Application Data

(60) Provisional application No. 63/041,526, filed on Jun. 19, 2020.

(51) Int. Cl.
*G06Q 40/08* (2012.01)
*G06N 20/00* (2019.01)
(Continued)

(52) U.S. Cl.
CPC .............. *G06Q 40/08* (2013.01); *G06N 20/00* (2019.01); *G06Q 10/20* (2013.01); *G06Q 50/16* (2013.01); *H04L 67/125* (2013.01)

(58) Field of Classification Search
CPC ..................................................... G06Q 40/08
See application file for complete search history.

(56) References Cited

U.S. PATENT DOCUMENTS

| 5,842,148 A | 11/1998 | Prendergast et al. |
| 8,433,344 B1 | 4/2013 | Virga |

(Continued)

FOREIGN PATENT DOCUMENTS

| AU | 2015100551 A4 | 5/2015 |
| CA | 2832330 A1 | 5/2014 |

(Continued)

OTHER PUBLICATIONS

Liu et al., "Design and Implementation of Smart-Home Monitoring System with the Internet of Things Technology," p. 5, Jan. 2016. Retrieved from: https://www.researchgate.net/publication/300330870_Design_and_Implementation_of_Smart-Home_Monitoring_System_with_the_Internet_of_Things_Technology.

(Continued)

*Primary Examiner* — Edward Chang
(74) *Attorney, Agent, or Firm* — Armstrong Teasdale LLP

(57) ABSTRACT

Provided herein is a damage prevention and mitigation (DPM) computing device including at least one processor in communication with a memory device. The at least one processor may be configured to identify a plurality of property parameters associated with a property wherein the property parameters are associated with one of a structure and design of the property; receive, via one or more telematics sensors, property telematics data; determine one or more damage factors associated with the property, wherein each damage factor includes an aspect of the property that increases a likelihood of the property incurring some damage; and generate a damage profile for the property based upon the determined damage factors, wherein the damage profile includes at least (a) one or more recommendations to (Continued)

address the damage factors and mitigate the likelihood that the property will incur damage, and (b) an insurance coverage amount for the property.

18 Claims, 5 Drawing Sheets

(51) Int. Cl.
*G06Q 10/20* (2023.01)
*G06Q 50/16* (2012.01)
*H04L 67/125* (2022.01)

(56) References Cited

U.S. PATENT DOCUMENTS

| | | | |
|---|---|---|---|
| 8,478,613 | B2 | 7/2013 | Diefendorf et al. |
| 8,527,306 | B1 | 9/2013 | Reeser et al. |
| 8,712,805 | B1 | 4/2014 | Ferries et al. |
| 8,831,677 | B2 | 9/2014 | Villa-Real |
| 9,798,993 | B2 | 10/2017 | Payne et al. |
| 9,978,033 | B1 | 5/2018 | Payne et al. |
| 10,042,341 | B1 | 8/2018 | Jacob |
| 10,055,793 | B1 | 8/2018 | Call et al. |
| 10,062,118 | B1 | 8/2018 | Bernstein et al. |
| 10,102,585 | B1 * | 10/2018 | Bryant .................. G06Q 50/16 |
| 10,229,394 | B1 | 3/2019 | Davis et al. |
| 10,269,076 | B1 | 4/2019 | Ton-That et al. |
| 10,282,787 | B1 | 5/2019 | Hakimi-Boushehri et al. |
| 10,296,978 | B1 | 5/2019 | Corder et al. |
| 10,388,135 | B1 | 8/2019 | Jordan, II et al. |
| 10,489,813 | B1 | 11/2019 | De Guia et al. |
| 10,522,009 | B1 | 12/2019 | Jordan, II et al. |
| 10,535,104 | B1 | 1/2020 | Mitchell et al. |
| 10,565,541 | B2 | 2/2020 | Payne et al. |
| 10,579,028 | B1 | 3/2020 | Jacob |
| 10,623,509 | B2 | 4/2020 | Delinselle et al. |
| 10,672,081 | B1 | 6/2020 | Lyons et al. |
| 10,685,402 | B1 | 6/2020 | Bryant et al. |
| 10,699,346 | B1 | 6/2020 | Corder et al. |
| 10,861,115 | B1 | 12/2020 | Stricker et al. |
| 10,943,306 | B1 * | 3/2021 | Gaudin ............. G06Q 30/0645 |
| 11,003,334 | B1 | 5/2021 | Conway et al. |
| 11,037,255 | B1 | 6/2021 | Ganev et al. |
| 11,055,797 | B1 | 7/2021 | Carone |
| 11,087,347 | B1 | 8/2021 | De Guia et al. |
| 11,087,420 | B1 | 8/2021 | Trundle |
| 11,210,741 | B1 | 12/2021 | Allen et al. |
| 11,501,100 | B1 | 11/2022 | Geng et al. |
| 11,656,097 | B2 | 5/2023 | Vega et al. |
| 11,748,817 | B2 | 9/2023 | Szott |
| 2008/0255862 | A1 | 10/2008 | Bailey et al. |
| 2011/0270773 | A1 | 11/2011 | Siekman et al. |
| 2011/0295624 | A1 | 12/2011 | Chapin et al. |
| 2012/0072239 | A1 | 3/2012 | Gibbard et al. |
| 2015/0061859 | A1 | 3/2015 | Matsuoka et al. |
| 2016/0042462 | A1 | 2/2016 | Coonrod et al. |
| 2016/0048934 | A1 | 2/2016 | Gross |
| 2016/0055594 | A1 | 2/2016 | Emison et al. |
| 2016/0275633 | A1 | 9/2016 | Gitt et al. |
| 2016/0321587 | A1 | 11/2016 | Gitt et al. |
| 2016/0357876 | A1 * | 12/2016 | Ali .................. G06F 16/907 |
| 2018/0033087 | A1 | 2/2018 | Delinselle et al. |
| 2018/0211328 | A1 | 7/2018 | Diefendorf et al. |
| 2019/0124134 | A1 | 4/2019 | Chmielewski et al. |
| 2019/0251520 | A1 | 8/2019 | Bentley, III et al. |
| 2020/0058076 | A1 | 2/2020 | Loo et al. |
| 2020/0066257 | A1 | 2/2020 | Smith et al. |
| 2020/0357075 | A1 * | 11/2020 | Dahl .................. G07C 5/0816 |
| 2021/0011448 | A1 | 1/2021 | Coleman et al. |
| 2021/0018335 | A1 | 1/2021 | Hood |
| 2021/0019847 | A1 | 1/2021 | Sneed |
| 2021/0150651 | A1 | 5/2021 | Shoup |
| 2021/0182986 | A1 | 6/2021 | Butler et al. |
| 2021/0279791 | A1 | 9/2021 | Jacoby |
| 2021/0350471 | A1 | 11/2021 | Hakimi-Boushehri et al. |
| 2022/0343443 | A1 | 10/2022 | Graham et al. |
| 2022/0391794 | A1 | 12/2022 | Singh et al. |
| 2023/0035517 | A1 | 2/2023 | Bentley, III et al. |

FOREIGN PATENT DOCUMENTS

| | | |
|---|---|---|
| CN | 107967575 A | 4/2018 |
| WO | 2000049589 A1 | 8/2000 |
| WO | 2012141606 A2 | 10/2012 |
| WO | 2013126866 A1 | 8/2013 |
| WO | 2018052595 A1 | 3/2018 |

OTHER PUBLICATIONS

Michalis et al., "Quality Evaluation of Residential Houses: The Development of a Real-Time Quality Assessment Tool," p. 11-12, Jan. 2013. Retrieved from: https://www.researchgate.net/publication/233841366_Quality_Evaluation_of_Residential_Houses_The_Development_of_a_Real-Time_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_cost-based_prioritisation_of_maintenance_activities.

Spoor et al., "How can data generated by smart home devices help identify consumer needs?," p. 7, Jul. 2016. Retrieved from: https://essay.utwente.nl/69990/1/Spoor_BA_BMS.pdf.

* cited by examiner

SYSTEMS AND METHODS FOR PROPERTY DAMAGE PREVENTION AND MITIGATION

CROSS-REFERENCE TO RELATED APPLICATIONS

This application claims the benefit of priority of U.S. Provisional Patent Application Ser. No. 63/041,526, filed Jun. 19, 2020, entitled "SYSTEMS AND METHODS FOR PROPERTY DAMAGE PREVENTION AND MITIGATION", the entire contents and disclosures of which is hereby incorporated herein by reference in its entirety.

FIELD OF THE DISCLOSURE

The present disclosure relates to mitigating home damage and, more particularly, to systems and methods for preventing and mitigating home damage based upon the collection of home telematics data.

BACKGROUND

Insurance essentially helps to provide a guarantee of compensation in the event of loss, damage, illness, or even death. Homeowner's insurance, or property insurance, provides owners with protection over their investment in the event of loss. Typical examples include loss due to fire, damage, theft, or the like. Property insurance may also include liability insurance, flood insurance, renters insurance, or even earthquake insurance.

Aside from a property structure, property insurance may also cover furnishings and other assets within a home (e.g., electronics, jewelry, etc.). Typically, a homeowner will want to protect their assets from catastrophe and therefore obtain insurance to protect their investments in the event of a loss. Homeowner's insurance rates, or premiums, are typically calculated based upon the home or property's value, along with other parameters, such as square footage of the home, number of inhabitants, age of the home, construction type, roof type, proximity to emergency services (e.g., police, fire, ambulance), claim history of surrounding homeowners, personal claim history, pets, homeowner's credit history, security systems (e.g., fire alarm, burglar alarm), locking systems (e.g., deadbolts), neighborhood crime rate, and other liability potentials (e.g., swimming pool, trampoline, machinery, playground equipment, etc.).

The prevention and mitigation of property loss benefits homeowners in many ways including obtaining homeowner's insurance coverage. In such cases, insurance claims may be reduced through the identification of ways to prevent home damage and property loss. Further, based upon home damage and property loss prevention techniques, premium rates may be reduced, thereby reducing the financial burden on a property owner. Current solutions lack the ability to provide advanced methods for preventing and mitigating of home damage or property loss. Systems and processes directed at addressing these known problems would be beneficial.

BRIEF SUMMARY

The present embodiments may relate to, inter alia, systems and methods for preventing and/or mitigating property (e.g., a home or residence) damage. In some embodiments, implemented techniques to prevent and mitigate property damage may be utilized to reduce a property owner's insurance burden by reducing the cost of the owner's insurance premium. Additionally, or alternatively, implemented techniques to prevent and mitigate property damage may improve the safety of a property's inhabitants, such as by the installation of certain alarms or security sensors. In some embodiments, data may be collected from one or more sensors installed in and around a property, such as in and around a dwelling. A draft schematic may be created based upon home sensor data which may be used to either create or even update and existing working schematic of a dwelling.

Based upon the working dwelling schematic, a risk profile or damage profile of the property may be formulated. As used herein, risk profile or damage profile may be used interchangeably, and such a profile may be used to indicate a likelihood that a property and/or dwelling may suffer damage that may otherwise be mitigated or avoided. The risk profile may indicate certain aspects of the property or dwelling that may expose the property or dwelling to a higher or increased likelihood of incurring some damage or theft. In some embodiments, one or more recommendations, or suggestions, may be generated for the prevention and mitigation of future property damage, theft, or the like. Further, based upon the risk profile, an insurance premium for the property may be adjusted accordingly. Over time, as certain recommendations are implemented, such as the installation of certain alarm devices, the risk/damage profile of the property may be updated to reflect this fact and the insurance premium may be adjusted, such as by way of a discount or the like.

In one aspect, a damage prevention and mitigation (DPM) computing device including at least one processor in communication with a memory device is provided. The at least one processor is configured to (i) identify a plurality of property parameters associated with a property wherein the property parameters are associated with one of a structure and design of the property, (ii) receive, via one or more telematics sensors, property telematics data, (iii) determine, based upon the property parameters and the property telematics data, one or more damage factors associated with the property, wherein each damage factor includes an aspect of the property that increases a likelihood of the property incurring some damage, and (iv) generate a damage profile for the property based upon the determined damage factors, wherein the damage profile includes at least (a) one or more recommendations to address the damage factors and mitigate the likelihood that the property will incur damage, and (b) an insurance coverage amount for the property. The DPM computing device may include additional, less, or alternate functionality, including that discussed elsewhere herein.

In another aspect, a computer-based method implemented by a damage prevention and mitigation (DPM) computing device comprising at least one processor in communication with a memory device may be provided. The method may include: (i) identifying a plurality of property parameters associated with a property, wherein the property parameters are associated with one of a structure and design of the property, (ii) receiving, via one or more telematics sensors, property telematics data, (iii) determining, based upon the property parameters and the property telematics data, one or more damage factors associated with the property, wherein each damage factor includes an aspect of the property that increases a likelihood of the property incurring some damage, and (iv) generating a damage profile for the property based upon the determined damage factors, wherein the damage profile includes at least (a) one or more recommendations to address the damage factors and mitigate the likelihood that the property will incur damage, and (b) an insurance coverage amount for the property. The method may include additional, less, or alternate actions, including those discussed elsewhere herein.

In yet another aspect, at least one non-transitory computer-readable storage media having computer-executable instructions embodied thereon may be provided. When executed by at least one processor in communication with at least one memory, the computer-executable instructions may cause the at least one processor to: (i) identify a plurality of property parameters associated with a property, wherein the property parameters are associated with one of a structure and design of the property, (ii) receive, via one or more telematics sensors, property telematics data, (iii) determine, based upon the property parameters and the property telematics data, one or more damage factors associated with the property, and/or (iv) generate a damage profile for the property based upon the determined damage factors, wherein the damage profile includes at least (a) one or more recommendations to mitigate a risk associated with the damage factors, and (b) a coverage amount for the property. The computer-readable storage media may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
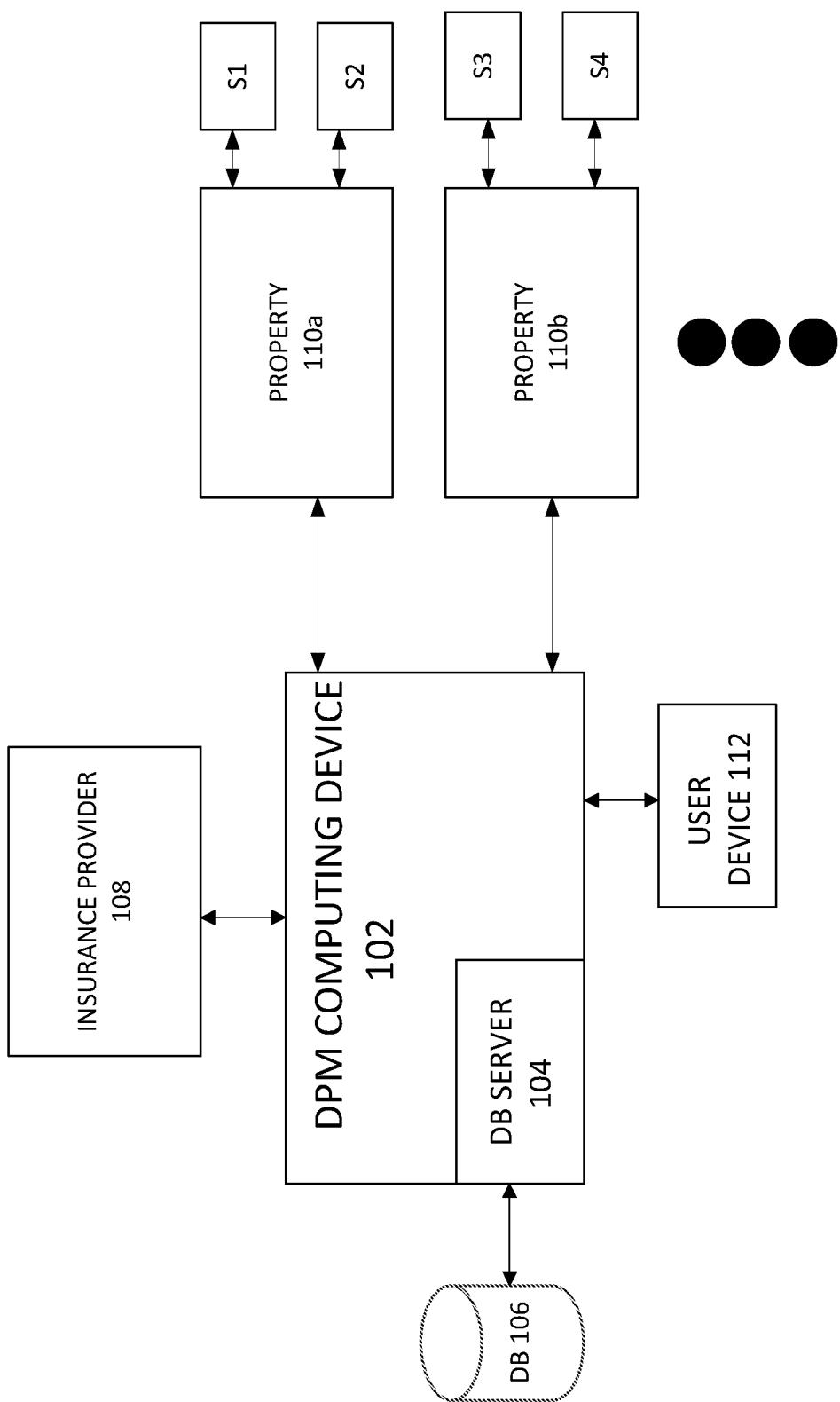
FIG. 1 illustrates an exemplary property damage prevention and mitigation (DPM) system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for preventing and/or mitigating property damage. In some embodiments, implemented techniques to prevent and mitigate property damage may be utilized to reduce a property owner's insurance burden by reducing the cost of the owner's insurance premium. Additionally, or alternatively, implemented techniques to prevent and mitigate property damage may improve the safety of a property's inhabitants, such as by the installation of certain alarms or security sensors. In some embodiments, data may be collected from one or more sensors installed in and around a property, such as in and around a dwelling. A draft schematic may be created based upon home sensor data which may be used to either create or even update and existing working schematic of a dwelling. Based upon the working dwelling schematic, a risk profile of the property may be formulated.

In some embodiments, one or more recommendations, or suggestions, may be generated for the prevention and mitigation of future property damage, theft, or the like. Further, based upon the risk/damage profile, an insurance premium for the property may be adjusted accordingly. Over time, as certain recommendations are implemented, such as the installation of certain alarm devices, the risk/damage profile of the property may be updated to reflect this fact and the insurance premium may be adjusted, such as by way of a discount or the like.

The systems and methods described herein may additionally or alternatively include the collection of insurance claims data with respect to an owner's property. Further, insurance claims data may also be collected with respect to surrounding properties in relation of the owner's property. In some embodiments, this collected data may be analyzed and used to contribute to formulating a risk profile associated with the owner's property. Insurance claims data may provide a snapshot of frequency of events with respect to fire damage, theft, and other property damage or loss.

In some embodiments, a data model may be created to accurately predict certain types of events. For example, an owner's property may be susceptible to flooding if surrounding properties frequently submit insurance claims concerning flooding events. Other types of events may be predicted as well, such as theft, earthquake, or weather events, for example. The collected data may also be analyzed to determine percentage of crime or intruder alerts. In some embodiments, these alerts may be compared in relation to people failing to lock their doors. In some embodiments, collected data may be subject to machine learning or artificial intelligence to identify certain patterns within the collected data. This historical data may be gathered and used to train one or more models that can be used to predict the likelihood that similar damage or theft may occur at the property or dwelling. The models may also be used to recommend steps to be taken by the property owner to mitigate or eliminate the likelihood of damage being incurred.

In some embodiments, systems and methods may be provided for the collection of home (or other property) telematics data. Aggregation of the home telematics data may be performed by a central computing device or server, such as a Damage Prevention and Mitigation (DPM) server. Home telematics data may be collected by one or more sensors installed within and around a dwelling located on a property. Although a "dwelling" or a "home" is sometimes referred to herein, it is for example purposes only. The DPM system could also be used for other types of property. Sensors may be strategically placed with respect to a dwelling and adjusted based upon real-time feedback provided by the DPM server, or the like.

Alternatively, real-time feedback may be provided by a local device in relation to the property. For example, surveillance cameras may be placed in strategic locations (e.g., front porch, back patio, living room, etc.).

Additionally, or alternatively, other sensors may be placed within and around a dwelling, such as the placement of temperature sensors within the home to monitor fluctuation in temperature (e.g., air or water). Further, some sensors, such as infrared sensors, may be utilized to detect piping or the like. Such data may be collected over time and stored within a database for further processing and analysis. In some embodiments, piping data may be reviewed and analyzed to identify possible water line damage. Other types of telematics data may be collected with respect to air quality, electrical appliance status, or the like.

In some embodiments, systems and methods may be provided for the creation of a risk profile based upon a schematic of a dwelling. For example, a schematic may be created to map out the dwelling and include representations of electrical wiring, gas lines, water lines, oil lines, etc. within the dwelling. Aggregated data may be gleaned from sensors installed within and around a dwelling and mobile device data or from other data sources, such as a property assessment provided by a third party. In some embodiments, one or more sensors may be installed with respect to a user's mobile device to monitor a property owner's activities, such as the usage of certain security systems, surveillance cameras, or the like.

Based upon the risk profile, one or more notifications may be generated and sent to a respective property owner. For example, a notification may include one or more recommendations or suggestions to prevent and/or mitigate home damage or loss. In some embodiments, the one or more recommendations may be made by an insurance provider. Additionally or alternatively, an insurance provider may indicate a discount that may be applied to the property owner's insurance premium upon adoption of the one or more recommendations.

In some embodiments, one or more recommended actions may include, but is not limited to, replacement/upgrade of windows, replacement/upgrade of doors and/or door locks, installation of a security system, installation of smoke/CO2 detectors, upgraded plumbing, upgraded electrical wiring, or the like. Strategically placed sensors may be relied upon for continuously updating a working schematic of a property. In turn, this may cause the risk profile of a certain property to also be updated. For example, a working schematic may be updated periodically (e.g., weekly, monthly) and the risk profile may be updated on a similar schedule.

Systems and methods are provided for home damage prevention and mitigation. As used herein, "damage" may refer to any type of property loss that may occur, such as fire, weather events, theft, accidents, acts of God, or the like. As used herein, "property" may refer to a typical landmass owned by an entity, such as a single person or a group of people, or even a business or government entity. A property may include one or more insured structures (e.g., house, shed, detached garage, pool house, etc.).

An insurance policy refers to any type of coverage provided, typically by an insurance agency, to insure against property loss. Different policies may provide for different levels of coverage based upon property characteristics (e.g., square footage, style, number of inhabitants, etc.) and location (e.g., flood zones, earthquake zones, high crime rate areas, acreage, etc.).

At least one of the technical problems addressed by this system may include: (i) incomplete home schematics for a particular property or dwelling which can be generated by the present system via the sensors arranged about the property; (ii) inefficient data collection schemes with respect to a property or dwelling; and (iii) unsafe spaces within a property lacking resources to prevent catastrophe.

A technical effect of the systems and processes described herein may be achieved by performing at least one of the following steps: (a) identifying schematics of a property through the collection of home telematics data; (b) creating a risk profile of the property based upon the identified schematics; and (c) implementing one or more issues with respect to a property to prevent and mitigate a catastrophe.

Generating Home/Property Parameter Data

In some exemplary embodiments, home, or property, parameter data may be generated based upon data gathered from one or more sensors around or within a home. For example, a sensor, such as a camera, may gather images in around the home. In one embodiment, 3D images may be rendered based upon collected image data. Additionally, or alternatively, image data may be collected over a period a time. In another embodiment, image data may be collected in response to motion detection. Image data may be collected from a stationary camera, a moving camera, such as one being carried by a person, or a camera attached to a mechanical device, such as a robot, or a drone, for example.

In some exemplary embodiments, image data may be collected from a plurality of sensors, such as cameras, to create and render a 3D image. For example, image data may be collected from a series of cameras placed around a home. In another embodiment, image data may be collected from a series of cameras placed within the confines of a home. Even further, in yet another embodiment, image data may be collected from sensors, such as cameras, placed outside of a home and placed within the confines of a home. In some embodiments, the strategic placement of cameras inside and around a home may enable a 3D rendering of a home to enable the creation of a walk-through video of the home. In some embodiments, the series of cameras may be stationary cameras, cameras having mobile capabilities (e.g., drone camera or robot camera), or combinations thereof. In some embodiments, an infrared sensor may be used to identify certain structures within a home.

In some exemplary embodiments, datasets may be associated with certain images gathered with respect to a home. Geo-spatial data may be associated with data captured by one or more sensors. For example, spatial data may be associated with image data to accurately identify certain locations of a home. Spatial data, or location data, may be assigned to sensor data automatically based upon machine learning and/or artificial intelligence (ML/AI) techniques.

Additionally, or alternatively, sensor data may be confirmed or assigned by a human user. For example, a human user may confirm that certain image data has been correctly identified using ML/AI techniques. This may be done by, for example, confirming that an image assigned as "front of house" is indeed a snapshot of the front of a house. Other location-based services may be used to identify sensor data, such as timestamp, GPS, or the like. Based upon sensor data identification, varying data collected by different types of sensors may be associated with one another. For example, image data of a portion of a home, such as a living room wall, may be associated with infrared sensor data collected with respect to the same living room wall.

In some exemplary embodiments, the collected sensor data, including image data, infrared sensor data, or the like, may be aggregated and used to determine a structure of a home. For example, sensors configured to perform infrared scans may determine home structure with respect to electrical wiring, plumbing, and other wiring, such as Internet, cable, DSL, phone wires, or the like. Additionally, or alternatively, historical property data may be used to determine a structure of a home.

Historical property data may include, but is not limited to, year built, materials used (e.g., brick, stone, wood, roof materials, etc.), square footage, kitchen size, number of bedrooms, finished/unfinished basement, attic space, crawlspace, fireplace, bathroom count and type, lot size (i.e. acreage), floor size, renovation history, home value, home type (e.g., condo, single-family, duplex, townhome, etc.), heating and cooling, parking options (e.g., off-street, garage, etc.), property tax, school tax, and home insurance claim history, for example.

Generating Home/Property Telematics Data

In some embodiments, one or more types of home, or property, telematics data may be generated. In at least one embodiment, telematics data may be gathered from a plurality of sensors placed in or around a home or property. In some embodiments, sensors may be placed in strategic locations within the home. For example, motion detecting sensors may be placed at entry points around the outside of the home, such as at the front door, at the garage door, at a back door, or the like. Additionally, or alternatively, sensors may be placed near windows, such as windows easily accessible from the ground or accessible via other means (e.g., a tree branch).

In some embodiments, the motion detecting sensors may include a camera that captures images, or video, in response to detected motion. Additionally, or alternatively, the sensor may transmit a signal in response to detected motion. Even further, the sensor may transmit a signal along with captured data collected by the camera in response to detected motion. In one embodiment, a user may view a live feed of data captured by the sensor, such as a video feed viewable on a mobile device, a computer display, a tablet, or the like. In some embodiments, the sensor may be a smart sensor that is connected to a network, such as the Internet, via a wireless or wired connection.

In some exemplary embodiments, one or more sensors may be placed around the outside of a home. One or more sensors may be placed inside a home. Alternatively, in some exemplary embodiments, systems and methods may be used to enable the collecting of home telematics data from both a plurality of sensors placed around the outside of a home and a plurality of sensors placed within the confines of a home.

In some exemplary embodiments, one or more sensors placed around the outside or inside a home may be used to collect a variety of types of telematics data with respect to the home. For example, home sensors used to collect home telematics data may include, but is not limited to, smart home sensors, infrared sensors, image data sensors, temperature sensors, weather or humidity sensors, smoke sensors, carbon dioxide sensors, air quality sensors, or the like. Additionally, or alternatively, mobile device sensors may be used to determine home telematics data.

Identifying Risk Factors for Risk Profile for Home/Property

In some embodiments, systems and methods may be provided for the creation of a risk profile based upon home telematics data. For example, aggregated data from a plurality of sensors installed within and around a home may be used to create a risk profile of a home. Additionally, or alternatively, a risk profile for a home may be generated based upon mobile device data or from other data sources, such as a property assessment provided by a third party. For example, a user's mobile device may be used to monitor a property owner's activities, such as the usage of certain security systems, surveillance cameras, or the like. Further, activities within the home may be monitored to contribute to the home's risk/damage profile. For example, usage of certain systems may be determined (e.g., burglar alarm usage, smoke alarm usage, etc.).

In some embodiments, machine learning models may be used to determine certain risk or damage factors for a home. In at least one exemplary embodiment, machine learning models may be utilized to determine the likelihood of possible failures in or around the home. For example, machine learning models may accurately predict that certain pipes, wiring, or even certain electrical appliances may fail within a certain time period. Additionally, or alternatively, machine learning models may determine whether the appliances within a home are operating correctly and/or efficiently. This may be done through the collection of sensor data that is collected with respect to an appliance, such as the temperature of water flowing to or within a dishwasher, for example. In other embodiments, electrical wiring may be determined by machine learning models to be up to code. In yet other embodiments, plumbing within a home may be determined by machine learning models to be faulty with respect to blockages, leakiness, or the like.

Systems and methods may be used to enable the determination of a home's occupancy. For example, based upon collected data, machine learning models may determine the status of a home with respect to it being shared, or rented, by multiple individuals, or a family, or even multiple families.

Property parameters, taken in combination with collected sensor data, may be used to determine the air quality of a home, which may accurately predict risk factors with respect to health of residents. For example, if a home has pets, the likelihood of certain health conditions may arise. In yet another embodiment, the presence of pets may also increase the likelihood of noise (e.g., barking dog, noisy chickens, etc.) which may lead to possible liability. Other areas of concern may include, but are certainly not limited to, storm damage risks (e.g., tornado, hurricane, flooding, etc.), usage of security systems, usage of door locks, locking of windows, or the like.

Generating Recommendations for a Home/Property

In some embodiments, systems and methods may include the generation of one or more recommendations for users based upon risk/damage profile data. For example, recommendations may be generated and transmitted to one or more residents of a home. In another embodiment, recommendations may be sent exclusively to a property owner, or a landlord. Based upon a generated risk profile, one or more notifications may include a series of recommendations or suggestions to prevent and/or mitigate home damage or loss. In some embodiments, the one or more recommendations may be made by an insurance provider. Additionally or alternatively, an insurance provider may indicate a discount that may be applied to the property owner's insurance premium upon adoption of the one or more recommendations.

In some embodiments, risk mitigation strategies may be recommended to a property owner, or resident, in order to improve the home, or to circumvent impending failure of one or more parts of a home. For example, in at least one embodiment, a recommendation may be made to upgrade wiring of a home based upon data revealing frayed wires or inefficient electrical wiring that may not be up to code. In another embodiment, a recommendation may be made to replace or upgrade plumbing within a home in response to the determination of faulty or leaky pipes. Other types may include, but is not limited to, adjusting the thermostat of the home to improve HVAC efficiency, suggest landscaping ideas to mitigate flooding risks, recommend the replacement of air filters to improve air quality within the home, or even recommend the installing of smoke/CO2 alarms within a home, as needed. Additionally, or alternatively, risk mitigation strategies may include the replacement of batteries within a smoke/CO2 alarm, or the like.

Identifying Supplemental Insurance for a Home/Property

In some embodiments, systems and methods may be used to identify additional insurance coverage that may be of interest to a property owner or resident. In some embodiments, supplemental insurance may be suggested to a property owner or resident based upon aggregated telematics data and other data collected. For example, if a certain property is shared, or rented, additional insurance coverage may be suggested. In some embodiments, if location data of a home reveals that the home's location is subject to frequent flooding events, or other weather-related events, supplemental insurance may be suggested accordingly.

Additionally, or alternatively, other types of supplemental insurance coverage may be offered to residents. For example, other types of insurance coverage may include, but is not limited to, term life insurance, additional liability insurance, or the like. In some embodiments, machine learning models may be used to generate one or more recommendations with respect to supplemental insurance coverages that should be offered. Further, details of the supplemental insurance may be determined based upon the above-identified risk factors. Details of the supplemental insurance may include, but is not limited to, premium price points, discounts, mark-ups, surcharges, or the like.

Determining Implemented Damage Mitigation Recommendations

In some embodiments, systems and methods may be used to enable the determination of whether residents, or property owners, have implemented one or more suggested recommendations. For example, sensors may collect additional data over time to determine whether changes have occurred within or around the home. In some embodiments, if a change has been detected, data collected with respect to the change may be aggregated from the one or more sensors. Based upon prior recommendations, it may be determined whether the change was made in response to at least one of the recommendations.

A risk profile may be updated to reflect the detected change. Additionally, or alternatively, an insurance policy premium may be adjusted based upon the detected change. For example, a discount may be applied to the policy premium of a home if a certain risk has been successfully mitigated. Every time a risk is mitigated, the likelihood of an insurance claim decreases.

Exemplary Computer System

FIG. 1 depicts an exemplary property damage prevention and mitigation (DPM) computing system 100. DPM computing system 100 may include a DPM computing device 102 (also referred to herein as DPM server or DPM computer device). DPM computing device 102 may include a database server 104. Further, DPM computing device 102 may be in communication with, for example, a database 106, an insurance provider device 108, one or more property devices 110*a* and 110*b*, and a user device 112.

In the exemplary embodiments, property devices 110*a* and 110*b* may be computers that include a web browser or a software application, which enables the devices to access remote computer devices, such as DPM computing device 102, using the Internet or another type of network. More specifically, property devices 110*a* and 110*b* may be communicatively coupled to DPM computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. Property devices 110*a* and 110*b* may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Further, in the exemplary embodiment, user devices 110*a* and 110*b* may include or be communicatively coupled to one or more sensor devices S1-S4. For simplicity, each property device shown includes only two sensors, but it is understood that many more devices may be used. For example, S1-S4 sensors may include, but are not limited to, camera devices, temperature sensors, motion detectors, infrared sensors, moisture sensors, air quality sensors, smoke detectors, lock sensors, mold sensors, or the like. Data collected by sensors S1-S4 may be transmitted to a connected property device, either wirelessly or via a wired connection, which may then transmit the data to DPM computing device 102. DPM computing device 102 may then store the collected home telematics data on database 106. The collected home telematics data may then be used to create and update home schematic data and also be statistically analyzed to formulate risk profiles. The DPM computing device 102 may also formulate one or more recommendations to mitigate property damage and transmit the one or more recommendations to a respective property device, such as property device 110*a* or 110*b*.

User device 112, and likewise insurance provider 108, may be a computer that includes a web browser or a software application, which enables user device 112 to access remote computer devices, such as DPM computing device 102, using the Internet or other network. In some embodiments, client device may be associated with, or part of a computer network associated with, an insurance company.

In other embodiments, user device 112 may be associated with a third party. More specifically, user device 112 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User device 112 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. User device 112 and insurance provider device 108 may be configured to also receive the recommendations that were formulated for a certain property. In some embodiments, an appropriate insurance provider, such as the insurance provider of a certain property, may be given the opportunity to provide incentives for implementing one or more of the recommendations, such as through an offer for a premium discount.

Database server 104 may be communicatively coupled to database 106 that stores data. In one embodiment, database 106 may include user data associated with users (e.g., personal information, insurance claims data), telematics and environmental data of the users, liability limits data of the users, prediction data, third party data, etc. In the exemplary embodiment, database 106 may be stored remotely from DPM computing device 102. In some embodiments, database 106 may be decentralized. In the exemplary embodiment, a user may access database 106 and/or DPM computing device 102 via property devices 110a and 110b.

Exemplary Communications Network

Figure 2:
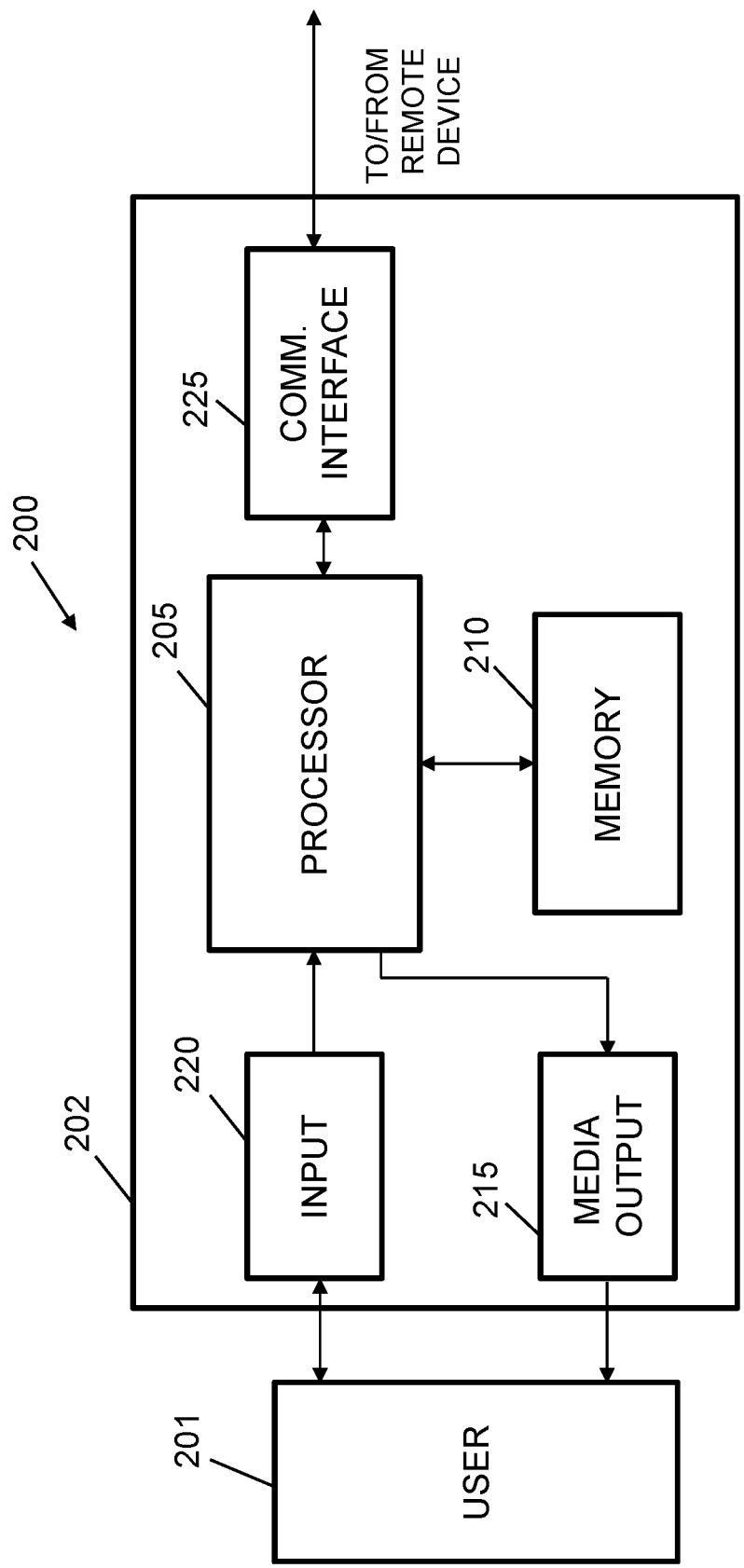
FIG. 2 illustrates an exemplary client computing device that may be used with the DPM system illustrated in FIG. 1.

FIG. 2 illustrates a block diagram 200 of an exemplary client computing device 202 that may be used with the DPM computing system 100 shown in FIG. 1. Client computing device 202 may be, for example, at least one of devices 108, 110a, 110b, and 112 (all shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In exemplary embodiments, processor 205 may include and/or be communicatively coupled to one or more modules for implementing the systems and methods described herein. For example, in one exemplary embodiment, a module may be provided for receiving home telematics data and creating a risk/damage profile based upon the received home telematics data. Processor 205 may include or be communicatively coupled to another module for generating one or more recommendations based upon the risk profile created in view of aggregated home telematics data.

In one or more exemplary embodiments, computing device 202 may also include at least one media output component 215 for presenting information a user 201. Media output component 215 may be any component capable of conveying information to user 201. In some embodiments, media output component 215 may include an output adapter such as a video adapter and/or an audio adapter. An output adapter may be operatively coupled to processor 205 and operatively coupled to an output device such as a display device (e.g., a liquid crystal display (LCD), a light emitting diode (LED) display, an organic light emitting diode (OLED) display, a cathode ray tube (CRT) display, an "electronic ink" display, a projected display, etc.) or an audio output device (e.g., a speaker arrangement or headphones). Media output component 215 may be configured to, for example, display a status of the model and/or display a prompt for user 201 to input user data. In another embodiment, media output component 215 may be configured to, for example, display a result of a liability limit prediction generated in response to receiving user data described herein and in view of the built model.

Client computing device 202 may also include an input device 220 for receiving input from a user 201. Input device 220 may include, for example, a keyboard, a pointing device, a mouse, a stylus, a touch sensitive panel (e.g., a touch pad or a touch screen), a gyroscope (e.g., gyroscope 118, shown in FIG. 1), one or more sensors (S1-S4, shown in FIG. 1), or an audio input device. A single component, such as a touch screen, may function as both an output device of media output component 215 and an input device of input device 220.

Client computing device 202 may also include a communication interface 225, which can be communicatively coupled to a remote device, such as DPM computing device 102, shown in FIG. 1. Communication interface 225 may include, for example, a wired or wireless network adapter or a wireless data transceiver for use with a mobile phone network (e.g., Global System for Mobile communications (GSM), 3G, 4G, or Bluetooth) or other mobile data networks (e.g., Worldwide Interoperability for Microwave Access (WIMAX)). The systems and methods disclosed herein are not limited to any certain type of short-range or long-range networks.

Stored in memory area 210 may be, for example, computer readable instructions for providing a user interface to user 201 via media output component 215 and, optionally, receiving and processing input from input device 220. A user interface may include, among other possibilities, a web browser or a client application. Web browsers may enable users, such as user 201, to display and interact with media and other information typically embedded on a web page or a website.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server Computing Device

Figure 3:
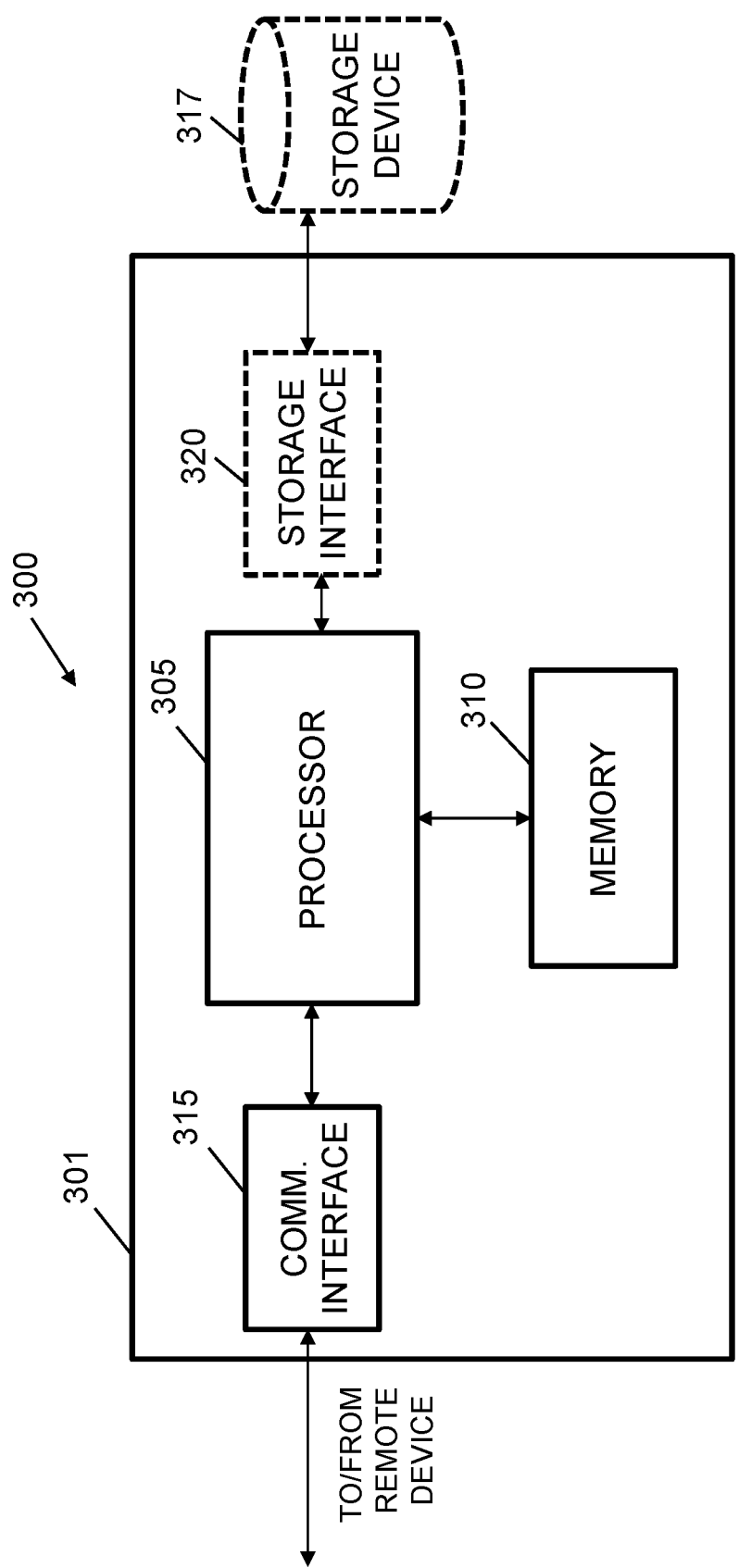
FIG. 3 illustrates an exemplary server system that may be used with the DPM system illustrated in FIG. 1.

FIG. 3 depicts a block diagram 300 showing an exemplary server system 301 that may be used with the DPM system 100 illustrated in FIG. 1. Server system 301 may be, for example, DPM computing device 102 or database server 104 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc.

It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 may be operatively coupled to a communication interface 315 such that server system 301 is capable of communicating with DPM computing device 102, user devices 108, 110a, 110b, and 112 (all shown in FIG. 1), and/or another server system. For example, communication interface 315 may receive data from user devices 110a and 110b via the Internet.

Processor 305 may also be operatively coupled to a storage device 317, such as database 106 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317.

In other embodiments, storage device 317 may be external to server system 301 and may be accessed by a plurality of server systems. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer system.

Exemplary Home Damage Prevention and Mitigation Computing Device and Components

Figure 4:
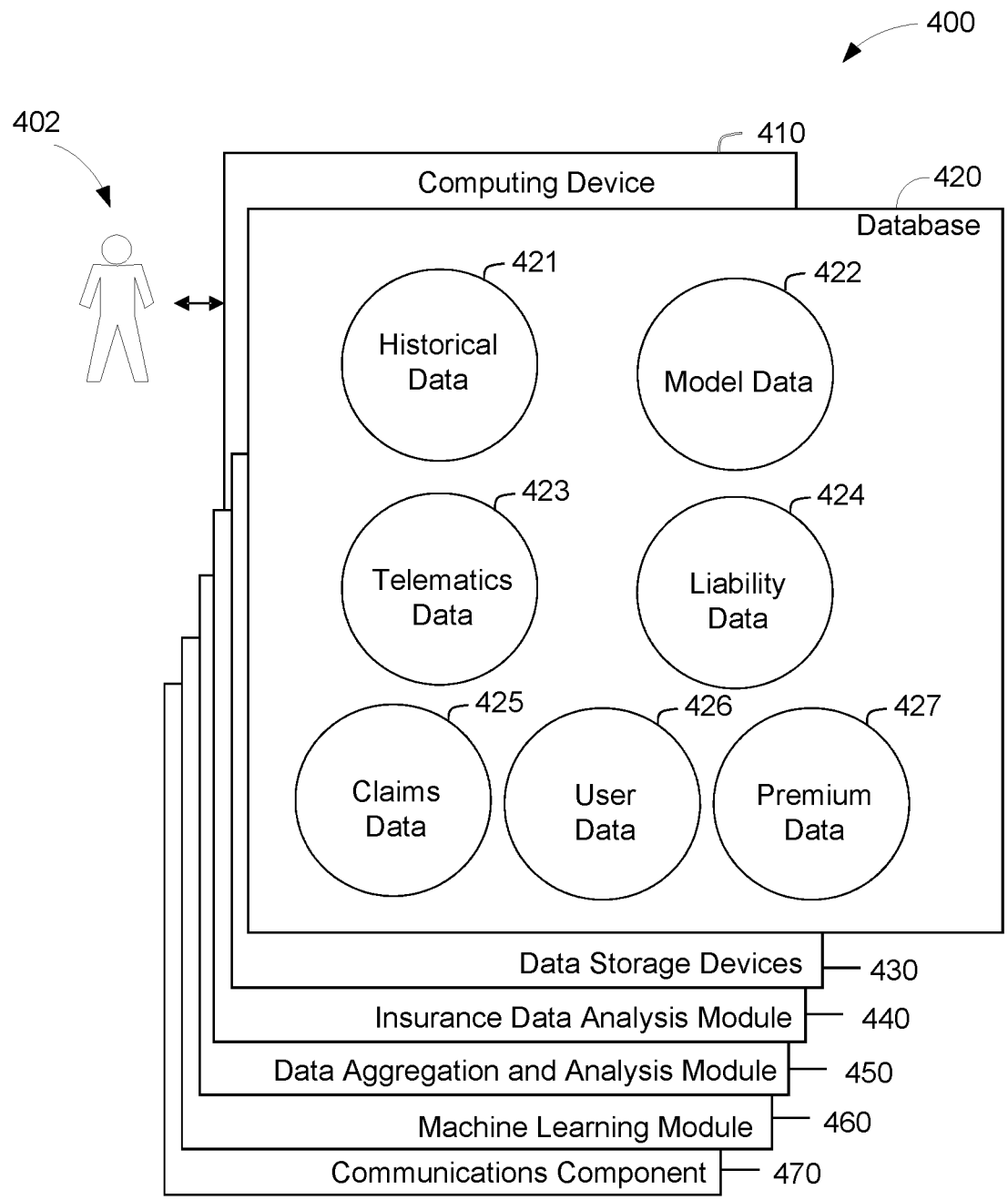
FIG. 4 illustrates a diagram of an exemplary computer device that may be found in the DPM system of FIG. 1.

FIG. 4 depicts a diagram 400 of components of one or more example computing devices 410 that may be used in a home damage prevention and mitigation (DPM) system, such as DPM computer system 100 (shown in FIG. 1). In some embodiments, computing device 410 may be similar to DPM computing device 102 (shown in FIG. 1). Database 420 may be coupled with several separate components within computing device 410, which perform specific tasks. In the present embodiment, database 420 may store aggregated data from users and/or sensors as described herein. Further, database 420 may store one or more risk profiles created by the systems described herein for accurately predicting one or more home damage prevention solutions. In some embodiments, database 420 is similar to database 106 (shown in FIG. 1).

Computing device 410 may include database 420, as well as data storage devices 430, which may be used, for example, for storing data, such any of the data mentioned herein, locally. Computing device 410 may also module 440, data aggregation and analysis module 450, machine learning module 460, and communications component 470, which may be utilized to implement the functionalities of a DPM computing device as described herein.

Exemplary Computer-Implemented Method for Prevention and Mitigation Home Damage

Figure 5:
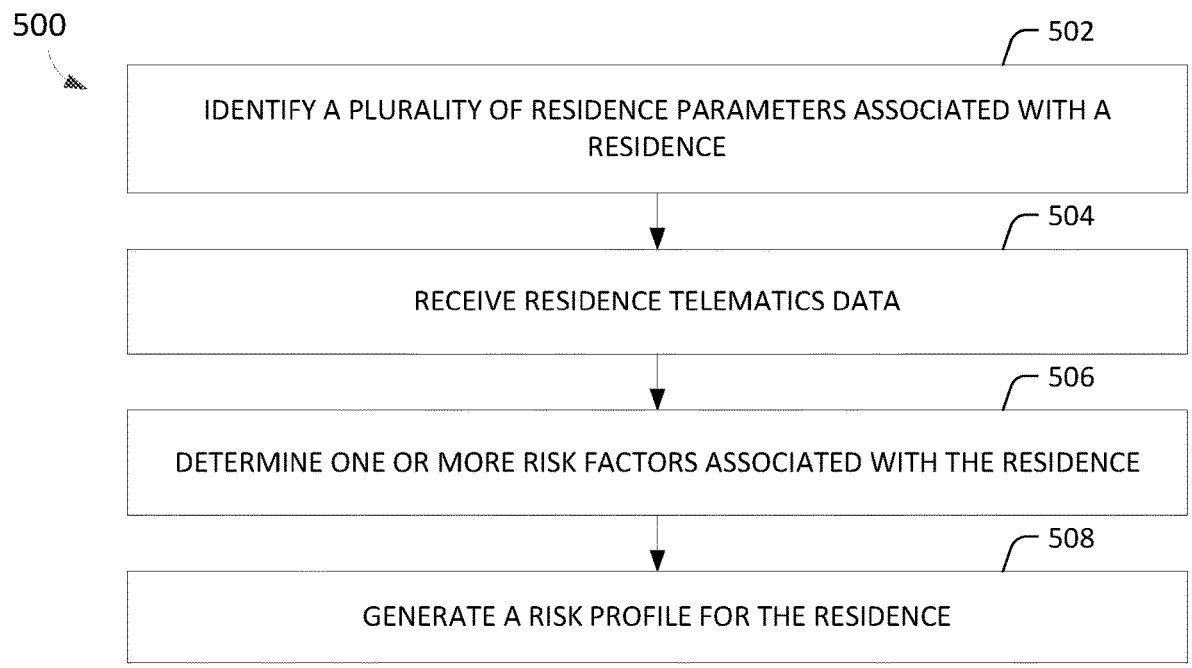
FIG. 5 illustrates an exemplary method for predicting liability levels using the DPM system illustrated in FIG. 1.

FIG. 5 depicts an exemplary method 500 for preventing and mitigation home damage based upon a risk profile for a property. Method 500 may be performed by DPM computing device 102 (shown in FIG. 1). The risk profile may be stored within a storage device associated with DPM computing device 102, such as database 106.

Method 500 may include identifying 502 a plurality of property parameters associated with a property, and the property parameters may be associated with one of a structure and design of the property. Method 500 may also include receiving 504 property telematics data. Specifically, the property telematics data may be received from one or more telematics sensors.

One or more risk factors associated with the property may be determined 506 based upon the property parameters and the property telematics data. Further, method 500 may include generating 508 a risk profile for the property based upon the determined 506 risk factors. The risk profile may include at least (i) one or more recommendations to mitigate a risk associated with the risk factors and (ii) a coverage amount for the property. Method 500 may include additional, less, or alternate actions, including those discussed elsewhere herein.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, audio and/or video records, text, and/or actual true or false values. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for pattern recognition. That is, machine learning algorithms may be used by TA computing device 102, for example, to identify patterns between initial and subsequent feedback provided by entities, such as clients or agencies, and in view of recommendations made by the TA computing device 102.

Accordingly, the systems and methods described herein may use machine learning algorithms for both pattern recognition and predictive modeling.

Exemplary Embodiments

In one embodiment, a property damage prevention and mitigation (DPM) computing device comprising at least one processor in communication with a memory device may be provided. The at least one processor may be configured to: (i) identify a plurality of property parameters associated with a property, wherein the property parameters are associated with one of a structure and design of the property, (ii) receive, via one or more telematics sensors, property telematics data, (iii) determine, based upon the property parameters and the property telematics data, one or more risk factors associated with the property, and/or (iv) generate a risk profile for the property based upon the determined risk factors, wherein the risk profile includes at least (a) one or more recommendations to mitigate a risk associated with the risk factors, and (b) a coverage amount for the property. The DPM computing device may include additional, less, or alternate functionality, including that discussed elsewhere herein.

Specifically, the at least one processor may further be configured to: (i) map a draft schematic of the property based upon the property parameters and the property telematics data, (ii) update a working schematic of the property based upon the draft schematic, (iii) transmit the recommendations to one or more users associated with the property, (iv) implement one or more actions based upon the one or more recommendations in response to a command issued by the one or more users, (v) receive a confirmation that the one or more actions have been implemented based upon subsequent sensor data collected from the one or more telematics sensors, (vi) update an insurance premium of the property based upon the confirmation and the subsequent sensor data, and/or (vii) update a working schematic based upon the confirmation and the subsequent sensor data.

Further, the one or more actions may include replacing or upgrading at least one of: windows, doors, roof, electrical wiring, appliances, plumbing, or construction materials of the property; the one or more telematics sensors may include one or more of a camera, a temperature sensor, an infrared sensor, or a thermal sensor, the one or more telematics sensors may strategically be positioned in relation to the property, the one or more telematics sensors may be installed on the exterior of the property, and the one or more telematics sensors may be installed on the interior of the property. The one or more telematics sensors may also be part of a mobile device.

In an example embodiment, the property data or property telematics data may be collected by the one or more telematics sensors include one or more of a number of occupants of the property, a temperature of the property, an air quality rating of the property, a door lock status, a noise level within the property, a noise level outside of the property, or a power consumption of devices within a property. Further, the one or more recommendations and the risk factors may be generated using machine learning techniques, artificial intelligence, or combinations thereof; the one or more property parameters may comprise of at least one of electronic schematics, piping diagrams, electrical diagrams, and construction materials associated with the property; and the risk factors may include one or more of the property being a rental property, foot traffic levels of the property, determined faults in relation to wiring or plumbing, internal temperature of the property, air quality of the property, and flooding risk of the property.

In another embodiment, a computer-based method implemented by a property damage prevention and mitigation (DPM) computing device comprising at least one processor in communication with a memory device may be provided. The method may include: (i) identifying a plurality of property parameters associated with a property, wherein the property parameters are associated with one of a structure and design of the property, (ii) receiving, via one or more telematics sensors, property telematics data, (iii) determining, based upon the property parameters and the property telematics data, one or more risk factors associated with the property, and/or (iv) generating a risk profile for the property based upon the determined risk factors, wherein the risk profile includes at least (a) one or more recommendations to mitigate a risk associated with the risk factors, and (b) a coverage amount for the property. The method may include additional, less, or alternate actions, including those discussed elsewhere herein.

In a further embodiment, at least one non-transitory computer-readable storage media having computer-executable instructions embodied thereon may be provided. When executed by at least one processor in communication with at least one memory, the computer-executable instructions may cause the at least one processor to: (i) identify a plurality of property parameters associated with a property, wherein the property parameters are associated with one of a structure and design of the property, (ii) receive, via one or more telematics sensors, property telematics data, (iii) determine, based upon the property parameters and the property telematics data, one or more risk factors associated with the property, and/or (iv) generate a risk profile for the property based upon the determined risk factors, wherein the risk profile includes at least (a) one or more recommendations to mitigate a risk associated with the risk factors, and (b) a coverage amount for the property. The computer-readable storage media may include additional, less, or alternate functionality, including that discussed elsewhere herein.

In a further embodiment, a damage prevention and mitigation (DPM) computing device including at least one processor in communication with a memory device is provided. The at least one processor is configured to (i) identify a plurality of property parameters associated with a property, wherein the property parameters are associated with one of a structure and design of the property, (ii) receive, via one or more telematics sensors, property telematics data, (iii) determine, based upon the property parameters and the property telematics data, one or more damage factors associated with the property, wherein each damage factor includes an aspect of the property that increases a likelihood of the property incurring some damage, and (iv) generate a damage profile for the property based upon the determined damage factors, wherein the damage profile includes at least (a) one or more recommendations to address the damage factors and mitigate the likelihood that the property will incur damage, and (b) an insurance coverage amount for the property.

The DPM computing device further includes the at least one processor configured to generate a current schematic of the property based upon the property parameters and the property telematics data, and update a working schematic of the property based upon the current schematic. The DPM computing device further includes the at least one processor configured to transmit the recommendations to one or more users associated with the property, and implement one or more actions based upon the one or more recommendations in response to a command issued by the one or more users. The DPM computing device further includes the at least one processor configured to receive a confirmation that the one or more actions have been implemented based upon subsequent sensor data collected from the one or more telematics sensors, update an insurance premium of the property based upon the confirmation and the subsequent sensor data, and update the working schematic based upon the confirmation and the subsequent sensor data. The DPM computing device further includes the one or more actions including replacing or upgrading at least one of: windows, doors, roof, electrical wiring, appliances, plumbing, or construction materials of the property.

The DPM computing device further including wherein the one or more telematics sensors include one or more of a camera, a temperature sensor, an infrared sensor, or a thermal sensor, wherein the one or more telematics sensors are strategically positioned in relation to the property, and wherein the one or more telematics sensors are installed on the exterior of the property, and wherein the one or more telematics sensors are installed on the interior of the property. The DPM computing device further including wherein the one or more telematics sensors are part of a mobile device. The DPM computing device further including wherein the property data or property telematics data collected by the one or more telematics sensors include one or more of a number of occupants of the property, a temperature of the property, an air quality rating of the property, a door lock status, a noise level within the property, a noise level outside of the property, or a power consumption of devices within a property. The DPM computing device further including wherein the one or more recommendations and the damage factors are generated using machine learning techniques, artificial intelligence, or combinations thereof. The DPM computing device further including wherein the one or more property parameters comprise of at least one of electronic schematics, piping diagrams, electrical diagrams, and construction materials associated with the property. The DPM computing device further including wherein the damage factors include one or more of the property being a rental property, foot traffic levels of the property, determined faults in relation to wiring or plumbing, internal temperature of the property, air quality of the property, and flooding risk of the property.

In a further embodiment, a computer-based method implemented by a property damage prevention and mitigation (DPM) computing device having at least one processor in communication with a memory device is provided. The method includes identifying a plurality of property parameters associated with a property wherein the property parameters are associated with one of a structure and design of the property; receiving, via one or more telematics sensors, property telematics data; determining, based upon the property parameters and the property telematics data, one or more damage factors associated with the property wherein each damage factor includes an aspect of the property that increases a likelihood of the property incurring some damage; and generating a damage profile for the property based upon the determined damage factors, wherein the damage profile includes at least (a) one or more recommendations to address the damage factors and mitigate the likelihood that the property will incur damage, and (b) an insurance coverage amount for the property.

The method may further include generating a current schematic of the property based upon the property parameters and the property telematics data; and updating a working schematic of the property based upon the current schematic. The method may further include transmitting the recommendations to one or more users associated with the property; and implementing one or more actions based upon the one or more recommendations in response to a command issued by the one or more users. The method may further include receiving a confirmation that the one or more actions have been implemented based upon subsequent sensor data collected from the one or more telematics sensors; updating an insurance premium of the property based upon the confirmation and the subsequent sensor data; and updating the working schematic based upon the confirmation and the subsequent sensor data. The method may further include the one or more actions including replacing or upgrading at least one of: windows, doors, roof, electrical wiring, appliances, plumbing, or construction materials of the property.

The method may further include the one or more telematics sensors including one or more of a camera, a temperature sensor, an infrared sensor, or a thermal sensor, wherein the one or more telematics sensors are strategically positioned in relation to the property, wherein the one or more telematics sensors are installed on the exterior of the property, and wherein the one or more telematics sensors are installed on the interior of the property. The method may further include the one or more telematics sensors being part of a mobile device. The method may further include the property data or property telematics data collected by the one or more telematics sensors include one or more of a number of occupants of the property, a temperature of the property, an air quality rating of the property, a door lock status, a noise level within the property, a noise level outside of the property, or a power consumption of devices within a property. The method may further include the one or more recommendations and the damage factors are generated using machine learning techniques, artificial intelligence, or combinations thereof.

The method may further include the one or more property parameters being at least one of electronic schematics, piping diagrams, electrical diagrams, and construction materials associated with the property. The method may further include the risk factors being one or more of the property being a rental property, foot traffic levels of the property, determined faults in relation to wiring or plumbing, internal temperature of the property, air quality of the property, and flooding risk of the property.

In a further embodiment, at least one non-transitory computer-readable storage media having computer-executable instructions embodied thereon is provided. When executed by at least one processor in communication with at least one memory, the computer-executable instructions cause the at least one processor to: identify a plurality of property parameters associated with a property wherein the property parameters are associated with one of a structure and design of the property; receive, via one or more telematics sensors, property telematics data; determine, based upon the property parameters and the property telematics data, one or more damage factors associated with the property; and generate a damage profile for the property based upon the determined damage factors, wherein the damage profile includes at least (i) one or more recommendations to mitigate a risk associated with the damage factors, and (ii) an insurance coverage amount for the property.

The computer-executable instructions may further cause the at least one processor to map a draft schematic of the property based upon the property parameters and the property telematics data; and update a working schematic of the property based upon the draft schematic. The computer-executable instructions may further cause the at least one processor to transmit the recommendations to one or more users associated with the property; and implement one or more actions based upon the one or more recommendations in response to a command issued by the one or more users. The computer-executable instructions may further cause the at least one processor to receive a confirmation that the one or more actions have been implemented based upon subsequent sensor data collected from the one or more telematics sensors; update an insurance premium of the property based upon the confirmation and the subsequent sensor data; and update a working schematic based upon the confirmation and the subsequent sensor data. The one or more actions may include replacing or upgrading at least one of windows, doors, roof, electrical wiring, appliances, plumbing, and construction materials of the property. The one or more telematics sensors may include one or more of a camera, a temperature sensor, an infrared sensor, or a thermal sensor, wherein the one or more telematics sensors are strategically positioned in relation to the property, wherein the one or more telematics sensors are installed on the exterior of the property, and wherein the one or more telematics sensors are installed on the interior of the property. The one or more telematics sensors may be part of a mobile device. The property data or property telematics data collected by the one or more telematics sensors may include one or more of a number of occupants of the property, a temperature of the property, an air quality rating of the property, a door lock status, a noise level within the property, a noise level outside of the property, or a power consumption of devices within a property. The one or more recommendations and the risk factors may be generated using machine learning techniques, artificial intelligence, or combinations thereof. The one or more property parameters may include of at least one of electronic schematics, piping diagrams, electrical diagrams, and construction materials associated with the property. The damage factors may include one or more of the property being a rental property, foot traffic levels of the property, determined faults in relation to wiring or plumbing, internal temperature of the property, air quality of the property, and flooding risk of the property.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A damage prevention and mitigation (DPM) computing device comprising at least one processor in communication with a memory device and one or more telematics sensors associated with one or more property devices of a property, the at least one processor configured to:
identify a plurality of property parameters associated with the property, wherein the property parameters are associated with one of a structure and design of the property;
train, using machine learning tools or artificial intelligence, one or more models by inputting the plurality of property parameters into the one or more models;
in response to detecting, by the one or more telematics sensors, an event associated with the property, receive, via the one or more telematics sensors, property telematics data associated with a functioning of the one or more property devices;
re-train, using the machine learning tools or artificial intelligence, the one or more trained models by inputting the property telematics data into the one or more models;
output, from the one or more re-trained models, a likelihood of damages to the property due to the functioning of the one or more property devices;
in response to outputting the likelihood of damages to the property, determine, using the one or more re-trained models, one or more damage factors associated with the property, wherein each damage factor includes an aspect of the property that increases the likelihood of the property incurring the damages;
in response to determining the one or more damage factors, output, from the one or more re-trained models, one or more recommended actions implementing one or more mitigation actions associated with the functioning of the one or more property devices for mitigating the likelihood of the property incurring the damages;
transmit the one or more recommended actions to the one or more property devices and one or more user computing devices associated with one or more users of the property;
in response to receiving a computer command from at least one of the one or more user computing devices, automatically cause the one or more property devices to implement the one or more recommended actions; and
detect one or more configuration changes associated with the one or more property devices based upon at least one of (i) an aggregation of subsequent sensor data collected from the one or more telematics sensors, or (ii) the one or more recommended actions, the detection performed to determine that the one or more recommended actions have been implemented.

2. The DPM computing device of claim 1, wherein the at least one processor is further configured to:

generate a current schematic of the property based upon the property parameters and the property telematics data; and
update a working schematic of the property based upon the current schematic.

3. The DPM computing device of claim 2, wherein the at least one processor is further configured to:
receive a confirmation that the one or more recommended actions have been implemented based upon the subsequent sensor data collected from the one or more telematics sensors;
update an insurance premium of the property based upon the confirmation and the subsequent sensor data; and
update the working schematic based upon the confirmation and the subsequent sensor data.

4. The DPM computing device of claim 1, wherein the one or more mitigation actions includes replacing or upgrading at least one of: windows, doors, roof, electrical wiring, appliances, plumbing, or construction materials of the property.

5. The DPM computing device of claim 1, wherein the one or more telematics sensors include one or more of a camera, a temperature sensor, an infrared sensor, or a thermal sensor, wherein the one or more telematics sensors are strategically positioned in relation to the property, wherein the one or more telematics sensors are installed on the exterior of the property, wherein the one or more telematics sensors are installed on the interior of the property, and wherein the one or more property devices include one or more web-based connectable equipment in communication with the one or more telematics sensors.

6. The DPM computing device of claim 1, wherein the one or more telematics sensors are part of a mobile device.

7. The DPM computing device of claim 1, wherein property data or the property telematics data collected by the one or more telematics sensors include one or more of a number of occupants of the property, a temperature of the property, an air quality rating of the property, a door lock status, a noise level within the property, a noise level outside of the property, or a power consumption of devices within the property.

8. The DPM computing device of claim 1, wherein the one or more recommended actions and the damage factors are generated using the machine learning tools, artificial intelligence, or combinations thereof.

9. The DPM computing device of claim 1, wherein the property parameters comprise of at least one of electronic schematics, piping diagrams, electrical diagrams, and construction materials associated with the property.

10. The DPM computing device of claim 1, wherein the damage factors include one or more of the property being a rental property, foot traffic levels of the property, determined faults in relation to wiring or plumbing, internal temperature of the property, air quality of the property, and flooding risk of the property.

11. A computer-based method implemented by a property damage prevention and mitigation (DPM) computing device comprising at least one processor in communication with a memory device and one or more telematics sensors associated with one or more property devices of a property, said method comprising:
identifying a plurality of property parameters associated with the property, wherein the property parameters are associated with one of a structure and design of the property;

training, using machine learning tools or artificial intelligence, one or more models by inputting the plurality of property parameters into the one or more models;

in response to detecting, by the one or more telematics sensors, an event associated with the property, receiving, via the one or more telematics sensors, property telematics data associated with a functioning of the one or more property devices;

re-training, using the machine learning tools or artificial intelligence, the one or more trained models by inputting the property telematics data into the one or more models;

outputting, from the one or more re-trained models, a likelihood of damages to the property due to the functioning of the one or more property devices;

in response to outputting the likelihood of damages to the property, determining, using the one or more re-trained models, one or more damage factors associated with the property, wherein each damage factor includes an aspect of the property that increases the likelihood of the property incurring the damages;

in response to determining the one or more damage factors, outputting from the one or more re-trained models, one or more recommended actions implementing one or more mitigation actions associated with the functioning of the one or more property devices for mitigating the likelihood of the property incurring the damages;

transmitting the one or more recommended actions to the one or more property devices and one or more user computing devices associated with one or more users of the property;

in response to receiving a computer command from at least one of the one or more user computing devices, automatically cause the one or more property devices to implement the one or more recommended actions; and detecting one or more configuration changes associated with the one or more property devices based upon at least one of (i) an aggregation of subsequent sensor data collected from the one or more telematics sensors, or (ii) the one or more recommended actions, the detection performed to determine that the one or more recommended actions have been implemented.

12. The computer-based method of claim 11 further comprising:

generating a current schematic of the property based upon the property parameters and the property telematics data; and updating a working schematic of the property based upon the current schematic.

13. The computer-based method of claim 12 further comprising:

receiving a confirmation that the one or more recommended actions have been implemented based upon the subsequent sensor data collected from the one or more telematics sensors;

updating an insurance premium of the property based upon the confirmation and the subsequent sensor data; and updating the working schematic based upon the confirmation and the subsequent sensor data.

14. The computer-based method of claim 11, wherein the one or more mitigation actions includes replacing or upgrading at least one of: windows, doors, roof, electrical wiring, appliances, plumbing, or construction materials of the property.

15. The computer-based method of claim 11, wherein the one or more telematics sensors include one or more of a camera, a temperature sensor, an infrared sensor, or a thermal sensor, wherein the one or more telematics sensors are strategically positioned in relation to the property, wherein the one or more telematics sensors are installed on the exterior of the property, wherein the one or more telematics sensors are installed on the interior of the property, and wherein the one or more property devices include one or more web-based connectable equipment in communication with the one or more telematics sensors.

16. The computer-based method of claim 11, wherein the one or more telematics sensors are part of a mobile device.

17. The computer-based method of claim 11, wherein property data or the property telematics data collected by the one or more telematics sensors include one or more of a number of occupants of the property, a temperature of the property, an air quality rating of the property, a door lock status, a noise level within the property, a noise level outside of the property, or a power consumption of devices within the property.

18. The computer-based method of claim 11, wherein the one or more recommended actions and the damage factors are generated using the machine learning tools, artificial intelligence, or combinations thereof.

* * * * *